United States Patent
Karmarkar et al.

(10) Patent No.: US 9,465,737 B1
(45) Date of Patent: Oct. 11, 2016

(54) MEMORY SYSTEMS INCLUDING A DUPLICATE REMOVING FILTER MODULE THAT IS SEPARATE FROM A CACHE MODULE

(71) Applicant: Toshiba Corporation, Minato-ku, Tokyo (JP)

(72) Inventors: Sandeep Karmarkar, Pune (IN); Paresh Phadke, Pune (IN)

(73) Assignee: Toshiba Corporation, Tokyo (JP)

(*) Notice: Subject to any disclaimer, the term of this patent is extended or adjusted under 35 U.S.C. 154(b) by 190 days.

(21) Appl. No.: 13/921,562

(22) Filed: Jun. 19, 2013

Related U.S. Application Data

(60) Provisional application No. 61/667,051, filed on Jul. 2, 2012.

(51) Int. Cl.
*G06F 12/0802* (2016.01)
*G06F 12/08* (2016.01)
*G06F 3/06* (2006.01)
*G06F 12/02* (2006.01)

(52) U.S. Cl.
CPC ......... *G06F 12/0802* (2013.01); *G06F 3/0608* (2013.01); *G06F 3/0641* (2013.01); *G06F 3/0656* (2013.01); *G06F 3/0683* (2013.01); *G06F 12/023* (2013.01)

(58) Field of Classification Search
None
See application file for complete search history.

(56) References Cited

U.S. PATENT DOCUMENTS

| | | | | |
|---|---|---|---|---|
| 4,920,478 A * | 4/1990 | Furuya et al. | | 711/136 |
| 8,457,018 B1 * | 6/2013 | Ruef et al. | | 370/256 |
| 8,473,690 B1 * | 6/2013 | Condict | | 711/141 |
| 8,732,403 B1 * | 5/2014 | Nayak | | 711/135 |
| 8,930,648 B1 * | 1/2015 | Storer et al. | | 711/154 |
| 9,043,555 B1 * | 5/2015 | Khona | G06F 3/0641 | 711/118 |
| 2007/0266056 A1 * | 11/2007 | Stacey | G06F 17/30221 | |
| 2008/0243992 A1 * | 10/2008 | Jardetzky | G06F 17/30067 | 709/203 |
| 2008/0276088 A1 * | 11/2008 | Ahlquist | | 713/168 |
| 2009/0089483 A1 * | 4/2009 | Tanaka et al. | | 711/103 |
| 2009/0089534 A1 * | 4/2009 | Zohar et al. | | 711/173 |
| 2010/0031000 A1 * | 2/2010 | Flynn et al. | | 711/216 |
| 2011/0055471 A1 * | 3/2011 | Thatcher et al. | | 711/114 |
| 2011/0125950 A1 * | 5/2011 | Haustein et al. | | 711/4 |
| 2011/0238634 A1 * | 9/2011 | Kobara | | 707/692 |
| 2012/0117562 A1 * | 5/2012 | Jess | G06F 9/45558 | 718/1 |
| 2012/0166401 A1 * | 6/2012 | Li et al. | | 707/692 |
| 2013/0054906 A1 * | 2/2013 | Anglin et al. | | 711/159 |
| 2013/0268498 A1 * | 10/2013 | Sisco et al. | | 707/692 |

* cited by examiner

*Primary Examiner* — Midys Rojas
*Assistant Examiner* — Chie Yew
(74) *Attorney, Agent, or Firm* — White & Case LLP

(57) ABSTRACT

A memory system includes a cache module configured to store data. A duplicate removing filter module is separate from the cache module. The duplicate removing filter module is configured to receive read requests and write requests for data blocks to be read from or written to the cache module, selectively generate fingerprints for the data blocks associated with the write requests, selectively store at least one of the fingerprints as stored fingerprints and compare a fingerprint of a write request to the stored fingerprints.

21 Claims, 5 Drawing Sheets

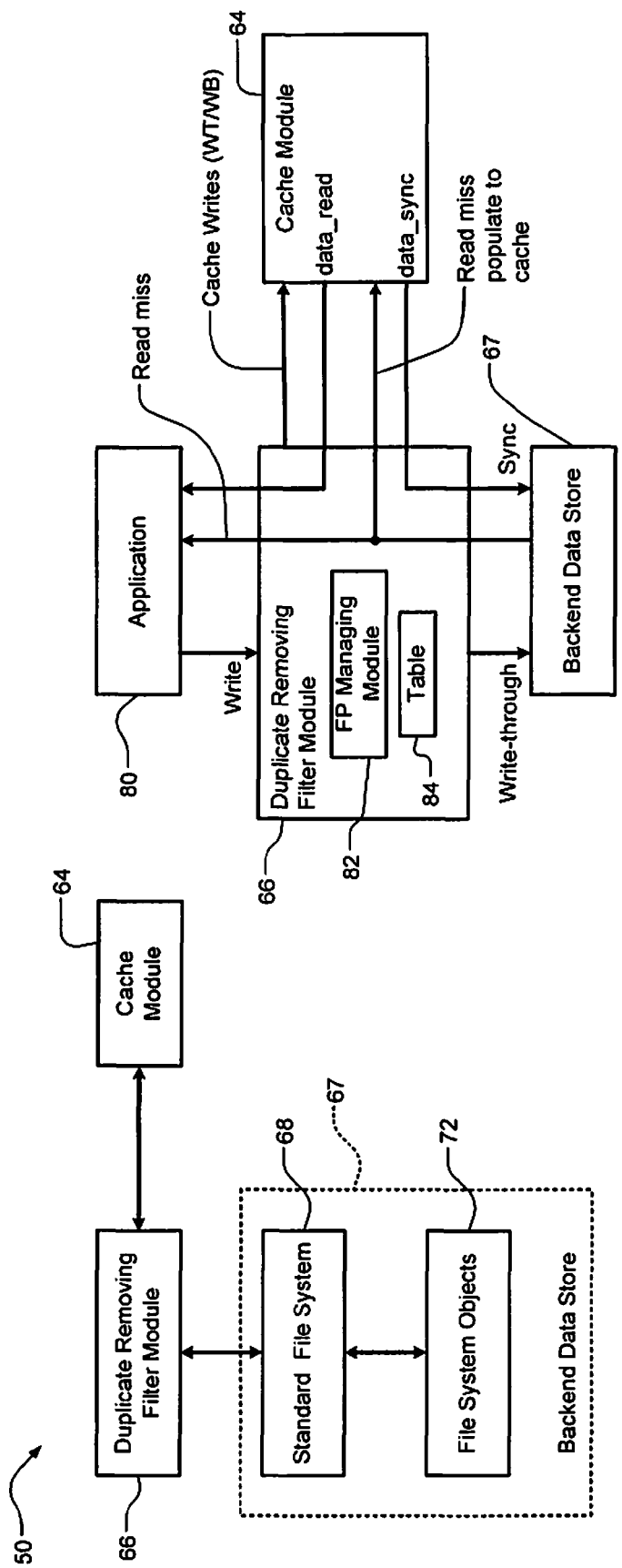

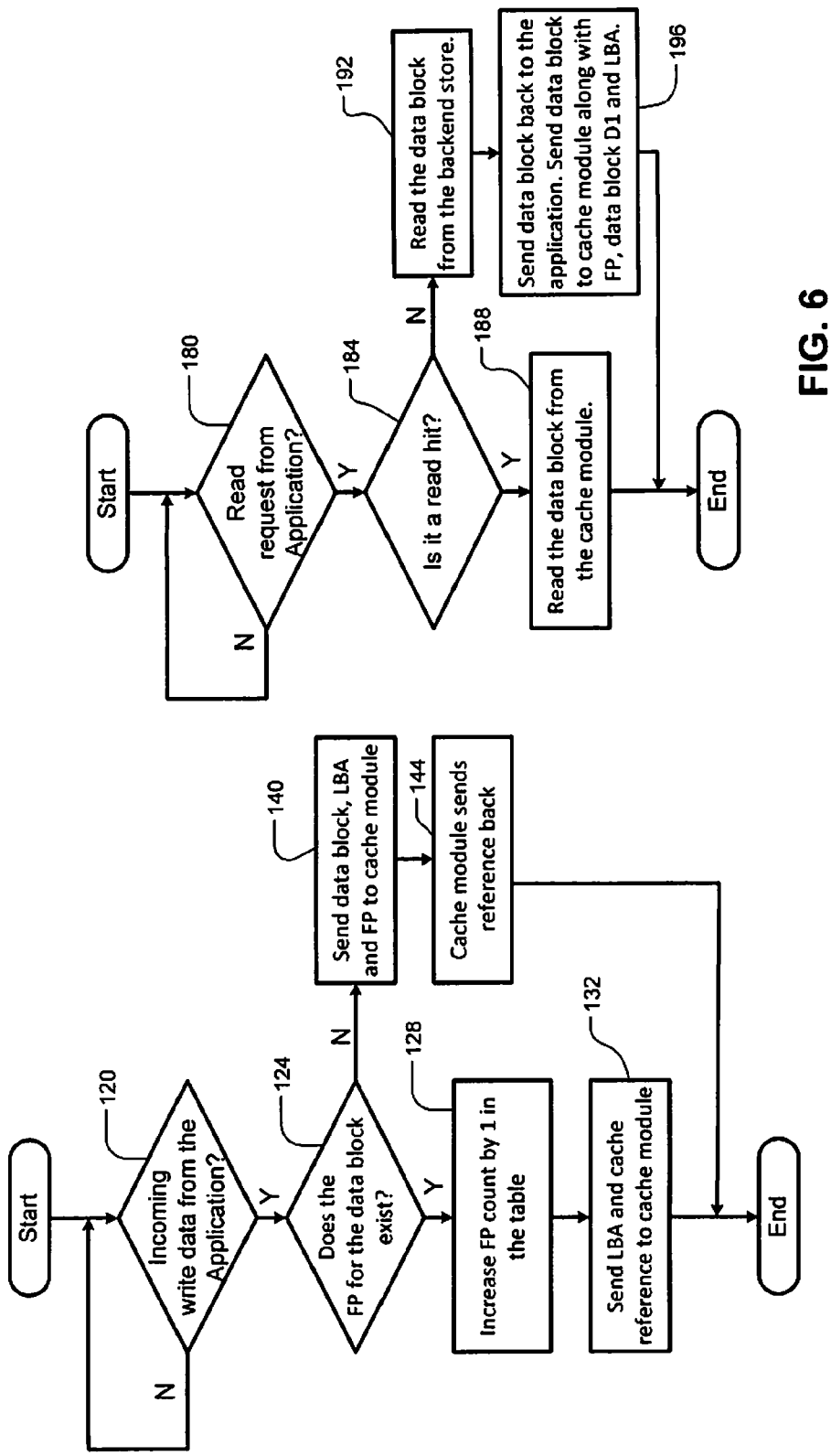

MEMORY SYSTEMS INCLUDING A DUPLICATE REMOVING FILTER MODULE THAT IS SEPARATE FROM A CACHE MODULE

CROSS-REFERENCE TO RELATED APPLICATIONS

This application claims the benefit of U.S. Provisional Application No. 61/667,051, filed on Jul. 2, 2012. The entire disclosure of the application referenced above is incorporated herein by reference.

FIELD

The present disclosure relates to systems using a cache, and more particularly to a duplicate removing filter module for the cache.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A host device such as a computer, smart phone or other device includes memory to store data. The memory may include a cache that is used to improve system performance. The cache stores data so that future requests for that data can be handled more quickly. The data that is stored within the cache may include values that were previously used and/or copies of values that are stored elsewhere.

If data requested by the host is stored in the cache, a cache hit occurs and the cache returns the data. Otherwise a cache miss occurs and the data is fetched from its original storage location. Performance improves as the number of cache hits relative to cache misses increases. However, cache is more expensive than standard memory. Therefore, the cache is usually quite a bit smaller than the standard memory. Designers tend to balance cost (which increases with cache size) and performance (which also increases with cache size). As can be appreciated, management of the cache can significantly improve cache performance. Since the cache is relatively small, it is important to remove duplicate data.

SUMMARY

A memory system includes a cache module configured to store data. A duplicate removing filter module is separate from the cache module. The duplicate removing filter module is configured to receive read requests and write requests for data blocks to be read from or written to the cache module, selectively generate fingerprints for the data blocks associated with the write requests, selectively store at least one of the fingerprints as stored fingerprints and compare a fingerprint of a write request to the stored fingerprints.

In other features, the duplicate removing filter module is configured to send one of the data blocks associated with the write request, a corresponding logical block address and the fingerprint of the write request to the cache module when the fingerprint of the write request does not match any of the stored fingerprints.

In other features, the duplicate removing filter module is configured to, when the fingerprint of the data block for the write request matches one of the stored fingerprints, send a logical block address and a cache reference corresponding to a matching one of the stored fingerprints to the cache module.

In other features, the duplicate removing filter module is configured to read one of the data blocks associated with a read request from the cache module when a read hit occurs.

In other features, the duplicate removing filter module is configured to read one of the data blocks associated with a read request from a backend data store when a read miss occurs; send the one of the data blocks from the backend data store to an application of a host device; generate a fingerprint for the one of the data blocks; and send the one of the data blocks, a corresponding logical block address and the fingerprint for the one of the data blocks to the cache module.

In other features, when the cache module evicts one of the data blocks, the cache module identifies whether the one of the data blocks is a duplicate or unique and sends a cache reference and the fingerprint corresponding to the one of the data blocks to the duplicate removing filter module.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 1 is an example of a functional block diagram of a memory system including a cache module, a duplicate removing filter module, and a backend data store including a standard file system and a file system object according to the present disclosure.

FIG. 2 illustrates an example of a diagram for the memory system of FIG. 1 according to the present disclosure.

FIG. 5 is a flowchart illustrating an example of a method for writing data according to the present disclosure.

FIG. 6 is a flowchart illustrating an example of a method for reading data according to the present disclosure.

In the drawings, reference numbers may be reused to identify similar and/or identical elements.

DESCRIPTION

Figure 4:
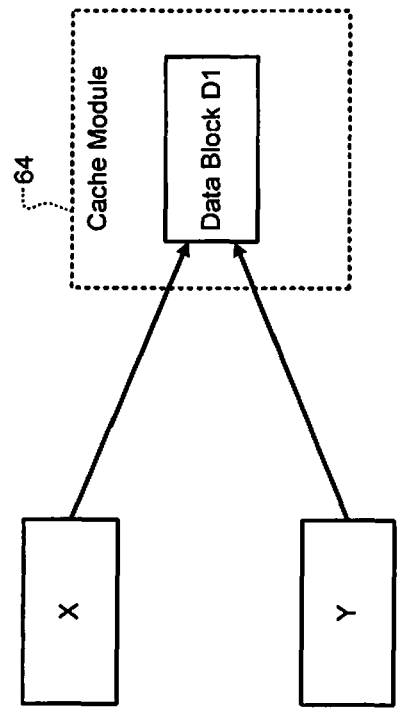
FIG. 4 illustrates an example of a cache metadata manager for a write operation for the memory system of FIG. 1 according to the present disclosure.

FIG. 1 shows a memory system 50 including a cache module 64, a duplicate removing filter module 66, and a backend data store 67 including a file system 68 and a file system object 72. In some examples, the file system object 72 is a standard Linux file system. Examples of the cache module 64 in the memory system 50 may include a solid state drive (SSD). The cache module 64 may be a monolithic integrated circuit.

Removal of duplicates is typically performed exclusively by the cache module 64. However, this approach may tend to limit performance since the processing power of the cache module 64 is somewhat limited as compared to processing power available at a host device. According to the present disclosure, the memory system 50 creates an additional layer that is separate from the cache module 50 to perform some of the processing relating to removing duplicates.

FIG. 2 illustrates a workflow for the memory system of FIG. 1. In a write-back operation, an application 80 associated with a host outputs a write request for a data block to the duplicate removing filter module 66. A fingerprint managing module 82 in the duplicate removing filter module 66 calculates a fingerprint for the data block and adds the fingerprint to a table 84. The fingerprint has a smaller size than the data block. In some examples, the fingerprint may be generated using a hash function that uniquely identifies data with a high probability. In some examples, the fingerprint managing module 82 generates the fingerprint using an algorithm such as SHA1 or SHA256, although other algorithms can be used. The duplicate removing filter module 66 sends the data block, the fingerprint and a corresponding logical block address to the cache module 64.

In a write-thru operation, the application 80 outputs a write request that is identified as a write-thru operation to the duplicate removing filter module 66. The duplicate removing filter module 66 operates as above. At the same time the data block will be sent directly to the backend data store 67 without duplicate removal.

In a read hit operation, the application 80 outputs a read request to the duplicate removing filter module 66. The duplicate removing filter module 66 checks the cache module 64 to determine whether the requested data is stored in the cache module 64. Duplicate removal will not be required because the duplicate removing filter module 66 points to the data block that is requested and sends the data back to the application 80.

In a read miss operation, the application 80 outputs a read request to the duplicate removing filter module 66. The duplicate removing filter module 66 checks with the cache module 64 to determine whether the requested data block is stored in the cache module 64. If not, the duplicate removing filter module 66 reads the data block from the backend data store 67 and sends the data block back to the application 80. The duplicate removing filter module 66 sends the data (either synchronously or asynchronously) to the cache module 64 to populate the cache module 64 for subsequent read iterations.

Figure 3:
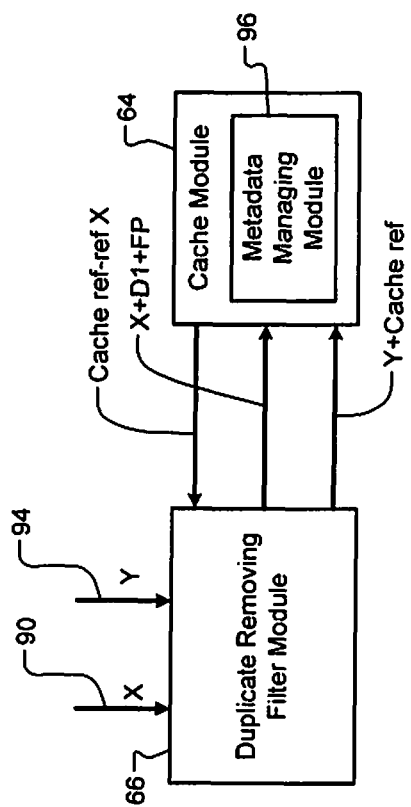
FIG. 3 illustrates an example of a diagram for a write operation for the memory system of FIG. 1 according to the present disclosure.

FIGS. 3 and 4 illustrate a workflow for a write operation for the memory system of FIG. 1. At 90, the application 80 outputs a first write request for logical block address X to the duplicate removing filter module 66. The fingerprint managing module 82 calculates the fingerprint and checks in the table 84 to determine whether the fingerprint already exists. If not, the duplicate removing filter module 66 sends the logical block address of X to the cache module 64 along with the data block D1 and the corresponding fingerprint. A metadata manager 96 of the cache 64 maintains the fingerprint of X along with X pointing to data block D1. The cache module 64 will also send a cache reference $c_{ref}$ back to the duplicate removing filter module 66.

At 94, the application 80 outputs a second write request corresponding to LBA Y to the duplicate removing filter module 66. The fingerprint managing module 82 calculates the fingerprint of the block and finds that the fingerprint is a duplicate of X. The duplicate removing filter module 66 sends Y and the cache reference $c_{ref}$ to cache module 64 and increments a fingerprint counter of X by 1 in the table 84. The duplicate removing filter module 66 maintains the cache reference of Y pointing to the data block of X. The duplicate removing filter module 66 sends the cache reference to the cache module to let the cache module know that Y is a duplicate of X. In FIG. 4, X and Y both point to data block D1 in cache metadata that is managed by a cache metadata managing module 96.

FIG. 5 illustrates an example of a method for writing data according to the present disclosure. At 120, control determines whether a write request with incoming data has been received at the duplicate removing filter module from the application. At 124, control determines whether a fingerprint for the data block exists. If 124 is true, control continues at 128 and increases the corresponding fingerprint count by one. At 132, control sends the logical block address and corresponding cache reference from the table to the cache module. The cache reference corresponds to the matched fingerprint in the table.

If 124 is false, the duplicate removing filter module sends the data block, logical block address and the fingerprint to the cache module. At 144, the cache module sends the cache reference $c_{ref}$ to the duplicate removing filter module.

FIG. 6 is a flowchart illustrating an example of a method for reading data according to the present disclosure. At 180, control determines whether a read request has been received at the duplicate removing filter module from the application. If 180 is true, control determines whether there is a read hit at 184. If 184 is true, control reads the data block from the cache module at 188 and control ends.

If 184 is false, control reads the data block from the backend data store at 192. At 196, the duplicate removing filter module sends the data block back to the application. The duplicate removing filter module also sends the data block to the cache module along with the fingerprint, the data block and the logical block address.

Figure 7:
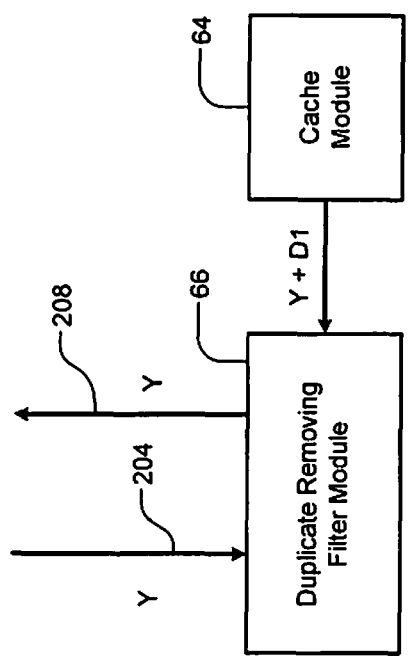
FIG. 7 illustrates a workflow for an example of a read hit according to the present disclosure.

FIG. 7 illustrates a workflow for an example of a read hit according to the present disclosure. At 204, the application 80 outputs a read request for LBA Y to the duplicate removing filter module 66. The duplicate removing filter module 66 sends the request for LBA Y to the cache module 64. The cache metadata points to data block D1. The cache module 64 returns the LBA Y and the data block D1 to the duplicate removing filter module 66. The duplicate removing filter module 66 sends the data block D1 to the application 80.

Figure 8:
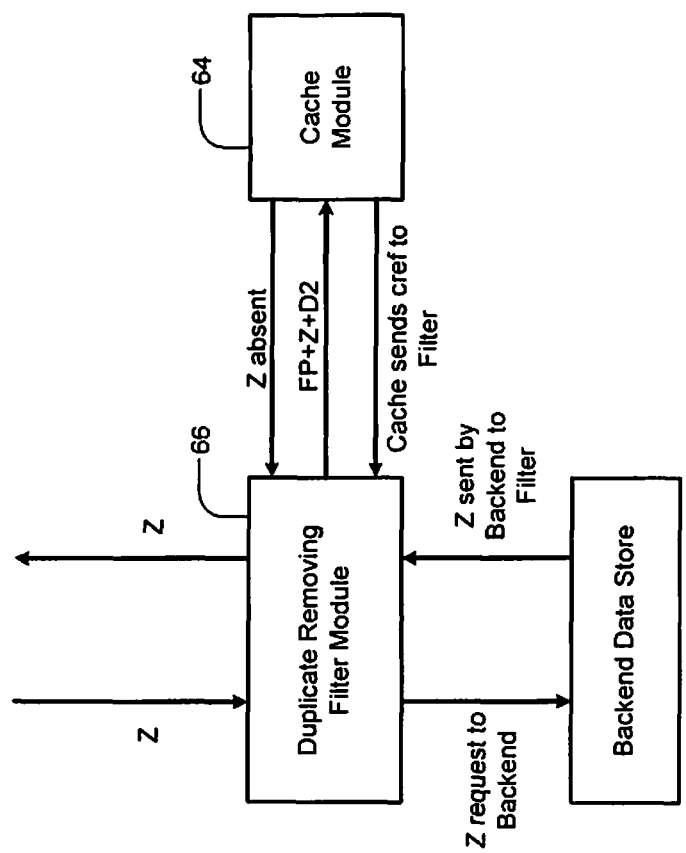
FIG. 8 illustrates a workflow for an example of a read miss according to the present disclosure.

FIG. 8 illustrates a workflow for an example of a read miss according to the present disclosure. The application 80 sends a read request for LBA Z to the duplicate removing filter module 66. The duplicate removing filter module 66 sends the request for the LBA Z and the fingerprint to the cache module 64 and/or generates the fingerprint and checks to see if it is present in the table. In this example, the LBA Z is not present in the cache module. The duplicate removing filter module 66 sends a request for the LBA Z to the backend data store. The backend data store sends the data block D2 corresponding to the LBA Z to the duplicate removing filter module 66. The duplicate removing filter module 66 calculates the FP and sends the FP, the data block D2 and the LBA Z to the cache module. The cache metadata managing module 96 adds metadata to an existing database stored therein. The LBA Z points to data block D2 in the cache module 64. The cache module 64 sends the cache reference for the LBA Z to the duplicate removing filter module 66 for subsequent read requests.

Figure 9:
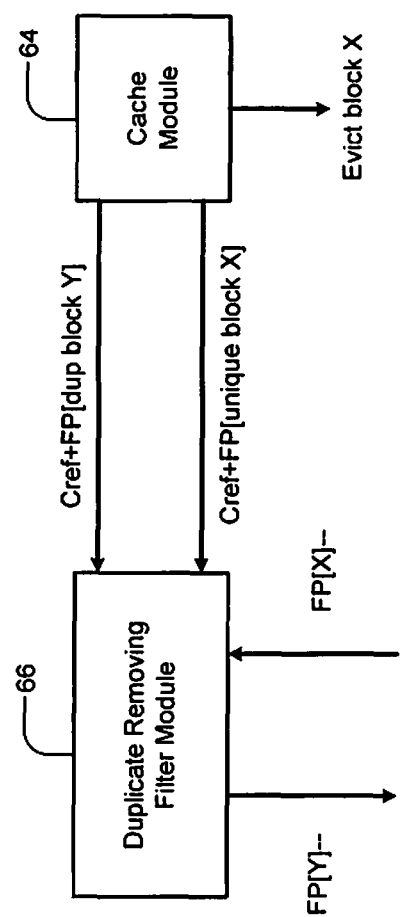
FIG. 9 illustrates a workflow for an example of an eviction according to the present disclosure.

FIG. 9 illustrates a workflow for an example of an eviction according to the present disclosure. The table 82 in the duplicate removing filter module 66 maintains a counter storing the number of duplicate fingerprints pointing to a single data block. When the cache module 64 evicts one of the data blocks, the cache module 64 sends the cache reference $c_{ref}$ and the fingerprint to the duplicate removing filter module 66 to decrement the counter maintained by the duplicate removing filter module 66. For duplicate block eviction, the cache module instructs the duplicate removing filter module 66 to reduce the counter. For unique block eviction, the counter will be reduced along with the data block eviction. Unique blocks are blocks that do not have duplicates.

Advantages include increasing the read hit ratio for the cache. The penalty incurred due to read-miss cycles in such designs will be reduced. However, there will be a latency increase due to increased cycles at the duplicate removing filter module.

The memory system according to the present disclosure separates the duplicate removing filter module 66 from the cache module 64 across a defined and complete set of interfaces. For example only, in one configuration the duplicate removing filter module 66 can be located on or associated with the host device while the cache module 64 can reside on a Peripheral Component Interconnect Express (PCIe) card. Alternately, the duplicate removing filter module 66 and the cache module 64 can be associated with the host or the PCIe card.

Each of these configurations has its own benefits with respect to CPU utilization, Plug-n-Play properties, performance limits, etc. The separation also allows the duplicate removing filter module 66 and the cache module 64 to be developed by two different parties.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A memory system comprising:
a cache memory configured to store data;
a backend data store;
a duplicate removing filter separate from the cache memory and configured to:
receive read requests and write requests for data blocks to be read from or written to the cache memory;
generate fingerprints for the data blocks associated with the write requests and store at least one of the fingerprints in the duplicate removing filter;
determine a match between a fingerprint of a data block of a write request and the at least one stored fingerprints;
send a logical block address of the write request and a cache reference corresponding to the matched fingerprint to the cache memory in response to a single condition indicating that the fingerprint of the data block matches the at least one stored fingerprints;
in response to receiving a write request as a write-back operation, send the logical block address of the write request, the fingerprint of the write request and the data block to the cache memory; and
in response to identifying a write request as a write-thru operation, the duplicate removing filter is configured to send the data block to the backend data store without performing duplicate removal.

2. The memory system of claim 1, wherein the cache memory is implemented as an integrated circuit.

3. The memory system of claim 1, wherein the cache memory comprises a solid state drive.

4. The memory system of claim 1, wherein the duplicate removing filter is configured to send one of the data blocks associated with the write request, the logical block address of the write request and the fingerprint of the write request to the cache memory when the fingerprint of the write request does not match any of the stored fingerprints.

5. The memory system of claim 4, wherein the cache memory is configured to send a cache reference to the duplicate removing filter in response to the duplicate removing filter sending the data block, the logical block address and the fingerprint to the cache memory.

6. The memory system of claim 4, wherein the cache memory is configured to maintain metadata including the fingerprint and the logical block address of the one of the data blocks associated with the write request.

7. The memory system of claim 1, wherein the duplicate removing filter increments a counter associated with the one of the stored fingerprints when the fingerprint of the write request matches one of the stored fingerprints.

8. The memory system of claim 1, wherein the duplicate removing filter is configured to read one of the data blocks associated with a read request from the cache memory when a read hit occurs.

9. The memory system of claim 1, wherein the duplicate removing filter is configured to:
read one of the data blocks associated with a read request from a backend data store when a read miss occurs;
send the one of the data blocks associated with the read request from the backend data store to an application of a host device;
generate a fingerprint for the one of the data blocks associated with the read request; and
send the one of the data blocks associated with the read request, a logical block address associated with the read request and the fingerprint for the one of the data blocks associated with the read request to the cache memory.

10. The memory system of claim 9, wherein the cache memory is configured to send a cache reference to the duplicate removing filter in response to the duplicate removing filter sending the one of the data blocks associated with the react request, the logical block address associated with the read request and the fingerprint for the one of the data blocks associated with the read request to the cache memory.

11. The memory system of claim 1, wherein the fingerprints uniquely identify the data blocks and when the cache memory evicts one of the data blocks, the cache memory identifies whether the one of the data blocks is a duplicate or unique and sends a cache reference and the fingerprint corresponding to the one of the data blocks to the duplicate removing filter.

12. The memory system of claim 11, wherein when the one of the data blocks to be evicted is a duplicate, the cache memory instructs the duplicate removing filter to reduce a counter associated with the one of the data blocks.

13. The memory system of claim 11, wherein when the one of the data blocks to be evicted is unique the cache memory is configured to:
instruct the duplicate removing filter to reduce a counter associated with the one of the data blocks; and
remove the one of the data blocks from the cache memory.

14. The memory system of claim 1, wherein, in response to identifying the write request as the write-thru operation, the duplicate removing filter is further configured to send the logical block address of the write request, the fingerprint of the write request and the data block to the cache memory without performing duplicate removal.

15. The memory system of claim 1, further comprising: an input connection configured to receive the write request as either the write-back or write-thru operation from an application on a host device.

16. A method for operating a memory system comprising:
separating a duplicate removing filter from a cache; and in the duplicate removing filter:
receiving read requests and write requests for data blocks to be read from or written to the cache memory;
generating fingerprints for the data blocks associated with the write requests and storing at least one of the fingerprints in the duplicate removing filter; and
determine a match between a fingerprint of a write request and the at least one of the stored fingerprints;
send a logical block address of the write request and a cache reference corresponding to the matched fingerprint to the cache in response to a single condition indicating that the fingerprint of the data block matches the at least one stored fingerprints;
in response to receiving a write request as a write back operation, send the logical block address of the write request, the fingerprint of the write request and the data block to the cache memory; and
in response to identifying the at least one request is for a write-thru operation, the duplicate removing filter sends the first data block to a backend data store without performing duplicate removal.

17. The method of claim 16, further comprising sending one of the data blocks associated with the write request, the logical block address of the write request and the fingerprint of the write request to the cache when the fingerprint of the write request does not match any of the stored fingerprints.

18. The method of claim 17, further comprising sending a cache reference to the duplicate removing filter in response to the duplicate removing filter sending the data block, the logical block address and the fingerprint to the cache.

19. The method of claim 17, further comprising maintaining metadata including the fingerprint and the logical block address of the one of the data blocks associated with the write request.

20. The method of claim 16, further comprising:
reading one of the data blocks associated with a read request from a backend data store when a read miss occurs;
sending the one of the data blocks associated with the read request from the backend data store to an application of a host device;
generating a fingerprint for the one of the data blocks associated with the read request; and
sending the one of the data blocks associated with the read request, a logical block associated with the read request address and the fingerprint for the one of the data blocks associated with the read request to the cache.

21. The method of claim 16, further comprising: receiving the write request as either the write-back or write-through operation from an application on a host device.

* * * * *